United States Patent [19]

Quintavalle et al.

[11] Patent Number: 4,559,190
[45] Date of Patent: Dec. 17, 1985

[54] PROCESS FOR THE PRODUCTION OF EXPANDED RETICULATED POLYETHYLENE

[75] Inventors: Saverio Quintavalle; Luciano Gargani, both of S. Donato Milanese, Italy

[73] Assignees: AGIP Petroli S.p.A., Rome; Industria Italiana Petroli S.p.A., Genoa, both of Italy

[21] Appl. No.: 657,961

[22] Filed: Oct. 5, 1984

[30] Foreign Application Priority Data

Oct. 14, 1983 [IT] Italy .................. 23300 A/83

[51] Int. Cl.$^4$ ................................ B29J 1/02
[52] U.S. Cl. ............................ 264/45.3; 264/54; 264/DIG. 18; 264/DIG. 64
[58] Field of Search ............... 264/DIG. 18, 54, 55, 264/45.3

[56] References Cited

U.S. PATENT DOCUMENTS

| | | | |
|---|---|---|---|
| 3,812,225 | 5/1974 | Hosoda et al. | 521/89 |
| 4,163,085 | 7/1979 | Kuhnel et al. | 264/DIG. 8 |
| 4,314,954 | 2/1982 | Ringdal | 264/55 |

FOREIGN PATENT DOCUMENTS

| | | | |
|---|---|---|---|
| 46-27598 | 8/1971 | Japan | 264/DIG. 18 |

*Primary Examiner*—Joseph L. Schofer
*Assistant Examiner*—Peter F. Kulkosky
*Attorney, Agent, or Firm*—Morgan, Finnegan, Pine, Foley & Lee

[57] ABSTRACT

Process for the preparation of bodies of expanded cross-linked polyethylene, with closed cells, comprising the steps of:

melting a polymer of ethylene selected among ethylene homopolymers, copolymers of ethylene with alpha-olefins, copolymers of ethylene with conjugated di-olefins and relevant mixtures;

homogenizing the polymer of ethylene in the molten state with a quantity of from 0.1 to 2.5% by weight of a cross-linking agent and with a quantity of from 2 to 25% by weight of an expanding agent, the cross-linking agent and expanding agent having a decomposition temperature higher than the melting point of the polymer of ethylene, the homogenizing step operating at temperatures of from 130° to 150° C., and for times of from 5 to 10 minutes;

forming the homogeneous mixture in a solid parallelepiped shape by means of extrusion and subsequent cooling, or by means of moulding wherein the extrusion or moulding step is operated at temperatures within the range of from 130° to 150° C. and for times of from 1 to 10 minutes;

placing the solid parallelepiped shaped body inside an air-tight closed container, pressurizing the container by means of an inert gas, and heating the solid parallelepiped shaped body, at a temperature higher than the decomposition temperature of the cross-linking agent and the expanding agent contained therein, wherein this step is operated at 170°–200° C., under 40–70 bar for 20–45 minutes, in the absence, or substantial absence of expansion, such that expansion is limited to less than about 5%;

depressurizing the container immediately following the foregoing pressurizing and heating step for a time of from 0.5 to 3 minutes, allowing the body to expand to an end volume smaller than the volume of the container, and recovering the expanded reticulated item from the container.

13 Claims, No Drawings

PROCESS FOR THE PRODUCTION OF EXPANDED RETICULATED POLYETHYLENE

The present invention relates to a process for expanding ethylene polymers, in order to manufacturing high thickness bodies, of expanded reticulated or cross-linked polyethylene, with closed cells.

The expanded cross-linked polyethylene is a product with many uses, e.g., as material for heat and sound insulation, in the manufacture of cushions, and in floating items.

According to a known process, expanded cross-linked polyethylene is prepared, in a continuous process, from a mixture of polyethylene, of the reticulating agent, and of the expanding agent, which is extruded, so as to form a continuous tape. The latter is heated, at the outlet from the extruder, while travelling on a conveyor device, so as to cause the decomposition of the cross-linking agent and of the expanding agent, and to consequently obtain a tape of expanded cross-linked polyethylene. This process allows an expanded cross-linked polyethylene tape to be obtained with low thickness, being therefore unsuitable for various uses.

According to the disclosure of U.K. Pat. No. 1,297,197, a mixture is prepared of polyethylene, of the cross-linking agent and of the expanding agent, which is placed within a closed mould, gas-tight, where it is heated at a temperature higher both than the softening temperature of the polyethylene, and the decomposition temperature of the cross-linking agent and of the expanding agent. In this way a cross-linked and expandable polyethylene is obtained, inside which the gas is dissolved which results from the decomposition of the expanding agent. The pressure of the mould is then released, by increasing its volume, thus allowing the polyethylene to expand and to occupy the total volume of expanded mould.

According to what is disclosed by the U.S. Pat. No. 3,640,915, polyethylene is first submitted to a cross-linking step in order to increasing its softening point and the thus obtained cross-linked polyethylene is heated at a temperature higher than its softening temperature, under a very high nitrogen pressure, so as to impregnate with nitrogen the molten polymer. the saturated polymer is then expanded by venting off the nitrogen.

The two latter processes described are affected first of all by the complexities deriving from the use of dilatable moulds and respectively of extremely high nitrogen pressures. It has moreover been observed that in the processes in which the polyethylene is caused to expand inside a container until it reaches an end volume equal to the volume of the container, faults appear in correspondance of the outer surfaces and of the regions immediately beneath, with consequent need of finishing and loss of valuable product.

According to the process of U.S. Pat. No. 3,812,225, a mixture of the polyolefin with the cross-linking agent and the expanding agent, is first heated under such conditions, as to cause a preliminary expansion, and the so obtained pre-expanded material is later on cooled and then submitted to the end expansion step. Such an operating procedure is expensive, since difficulty is encountered for obtaining expanded materials with low density values utilizing economically acceptable quantities of an expanding agent.

It is therefore the purpose of the present invention to provide a process for producing expanded cross-linked polyethylene, as regular bodies, with very high thickness too, free or substantially free from the drawbacks mentioned.

More particularly, it is the object of the present invention is to provide a simple and economically profitable process for the production of expanded cross-linked polyethylene, with closed cells, such cells being thin and evenly distributed throughout the whole mass, said process being moreover able to produce regular expanded bodies, also of high or very high thickness, free or substantially free from those faults on their outer surfaces and in the regions immediately beneath, which require finishing treatments of the expanded body.

More particularly, the process for the production of expanded cross-linked polyethylene according to the present invention comprises the steps of:

to melt an ethylene polymer selected among ethylene homopolymers, copolymers of ethylene with alpha-olefins, copolymers of ethylene with conjugated diolefins and relevant mixtures;

to homogenize said ethylene polymer, in the molten state, with a cross-linking agent and an expanding agent, until a homogeneous mixture is obtained;

to give to said homogeneous mixture a solid parallelepiped shaped by means of extrusion and subsequent cooling, or moulding, to place the parallelepiped shaped solid body inside an air-tightly closed container; to pressurize the container by means of an inert gas and to heat the parallelepiped shaped body at a temperature higher than the decomposition temperature of cross-linking agent and of expanding agent contained therein, in the absence or in the substantial absence of expansion;

to depressurize the container, allowing the shaped body to expand to an end volume smaller than the volume of the container;

to recover the expanded cross-linked item from the container.

A suitable ethylene polymer for the process according to the invention is the low density polyethylene, industrially obtained by means of high pressure producing processes, generally inside tubular reactors and in the presence of radical catalysts. Preferably to the purposes of the present invention, such polyethylene should show specific gravity values of from 0.92 to 0.925 g/ml, and melt index values of from 0.2 to 2 g/10′.

Another useful polyethylene grade is the ethylene-propylene copolymer, generally containing from 1 to 2% by weight of propylene, industrially obtained by copolymerizing ethylene with propylene, in the presence of Ziegler-type catalysts. According to the purposes of the present invention, such a copolymer is preferred with specific gravity values of from 0.95 to 0.96 g/ml, and with melt index values of from 0.2 to 2 g/10′.

Another useful polyethylene grade is the ethylenebutene-1 copolymer, generally containing from 0.5 to 4% by weight of butene, industrially obtained by copolymerizing ethylene with butene-1, in the presence of Ziegler-type catalysts. Such polyethylene is also denominated as low density linear polyethylene (LLDPE). Within the purposes of the present invention, such a polyethylene is preferred with specific gravity values of from 0.93 to 0.96 g/ml, and with melt index values of from 0.2 to 2 g/10′.

A further useful polyethylene grade is the ethylenebutadiene copolymer, generally containing from 2 to 4% by weight of butadiene, industrially obtained by means of the copolymerization of ethylene with butadiene. Within the purposes of the present invention, such a polyethylene is preferred with specific gravity values of from 0.94 to 0.95 g/ml and with melt index values of from 0.2. to 2 g/10'.

Obviously, in the practical embodiments of the invention, mixtures can be used of said polymers.

According to the process of the present invention, the selected polyethylene (or the selected mixture of polyethylenes) is caused to melt, at temperatures generally ranging from 130° to 150° C., and the molten polymer is homogenized with a cross-linking agent and with an expanding agent, having a decomposition temperature higher than the melting point of the copolymer used.

Cross-linking agents suitable to this purpose are organic peroxides, which are decomposed at a temperature which is higher than the melting temperature of polyethylene, by at least 10° C., and up to 80° C. For the purposes of the present invention the meaning of the terms reticulating agent and cross-linking agent are to be considered interchangeable as would be recognized by those skilled in the art.

Examples of such peroxides are: dicumyl peroxide, 1,3-bis(tert.-butylperoxy-isopropyl)benzene, tert.butyl-cumyl peroxide, 2,5-dimethyl-2,5-di(tert.-butylperoxy)-hexane and 2,5-dimethyl-2,5-di(tert.-butylperoxy)hexyne. The quantity of peroxide which is suitable for polyethylene cross-linking is generally comprised within the range of from 0.1 to 2.5% by weight and preferably from 0.2 to 1.5% by weight relatively to the ethylene polymer. Only in the case of ethylene-conjugated diolefin copolymers, a mixture can be used of sulphur and of the usual rubber accelerators, as the cross-linking agent.

The expanding agents suitable to the purpose of the invention, are liquid or solid compounds which are decomposed, with the release of normally gaseous products, at a temperature higher than the melting temperature of polyethylene, by at least 5° C. and up to about 70° C. For the purposes of the present invention the terms expanding agent and blowing agent are to be considered interchangeable as would be recognized by those skilled in the art. Examples of expanding agents are: azodicarbonamide, p-toluenesulphonylsemicarbazide, p-carboxy-N-nitroso-N-methylbenzamide, N,N'-dinitroso-pentamethylenetetramine, N-nitroso-N-alkylamides of aromatic carboxyl acids, trans-N,N'-dinitroso-N,N'-dimethylhexahydroterephtalamide and diphenylsulphone-3,3'-disulphohydrazide. The quanity of expanding agent which is suitable for a satisfactory expansion of polyethylene is generally comprised within the range of from 2 to 25% by weight, and preferably from 5 to 15% by weight relatively to the ethylene polymer.

In addition to the cross-linking agent and to the expanding agent, one or more additive(s) can be added to and homogenized with the molten ethylene polymer, selected among dyes, fillers, lubricants, pigments and flame retardants.

According to a pratical embodiment of the process of the present invention, the ethylene polymer is melted inside a mixer, at a temperature between 130° and 150° C., and to the molten polymer the cross-linking agent and the expanding agent are added, and optionally one or more additives are added, selected from the previously shown classes. A satisfactory homogenization is generally obtained by mixing the mass for a time of from 5 to 10 minutes.

The control of the temperatures and of the times shall be particularly accurate during this homogenization step of the molten ethylene polymer with the cross-linking and the expanding agents, in order to avoiding the occurrence of early decomposition of such agents. An untimely incipient decomposition of the expanding agent leads to the obtainment of items with uneven cellular characteristics through their thickness, and with the appearance of crater-like faults in the central part of the item. An untimely incipient cross-linking results, during the subsequent extrusion and cooling or moulding step, into solid parallelepiped shaped bodies geometrically irregular, and said geometrical irregularity is reflected, and amplified, in the end item. For the purposes of the present invention a parallel shaped body is a parison as would be recognized by those skilled in the art.

According to the process of the present invention, the homogenized mass of ethylene polymer, cross-linking agent, expanding agent and other possible additives, is compression moulded within a mould, obtaining a solid parallelepiped shaped body or slab, of regular shape. To this purpose, moulds can be used with dimensions of from 20 to 40 cm, and thickness of from 1 to 2 cm. Suitable moulding conditions are: temperature of from 130° to 150° C, pressures of from 50 to 80 bar, and times of from 1 to 10 minutes, e.g., 5 minutes. After the cooling, a solid and regular parallelepipedon (slab) is obtained, with dimensions equal to those of the mould used.

According to a different embodiment of the present invention, the homogenizing of the molten ethylene polymer, the cross-linking agent, the expanding agent, and the possible other additives, is carried out in an extruder, and the homogenized mixture is extruded and cut to form solid and regular slabs after the cooling.

The homogenization times and temperatures are always comprised within the ranges of values hereinbefore mentioned.

By operating as previously described, no decompositions, or substantial decompositions, occur of the cross-linking agent and of the expanding agent, and a solid and regular parallelepipedon or slab is obtained, which constitutes the suitable pre-form for the subsequent expansion treatment. The regularity of the slab, in particular the regularity of its geometrical shape, is an important feature in order to achieving a regular expansion, and expanded bodies with a geometrical shape similar to the slab, which do not require any finishing treatments, or which require very limited finishing treatments.

According to the process of the present invention, the slab, obtained as previously shown, is placed inside a closed gas-tight container, e.g. an autoclave. The slab may simply be laid on a metallic support positioned on the bottom of the autoclave. The autoclave is then pressurized by an inert gas, generally nitrogen, and is heated at a temperature higher than the decomposition temperature of the cross-linking agent and of the expanding agent. In practice, this step is carried out at a temperature comprised within the range of from 170° to 200° C., under a pressure of nitrogen, or of another inert gas, of from 40 to 70 bar, and with times of from 20 to 45 minutes, to obtain a slab of molten and cross-linked polyethylene, containing dissolved therein the gaseous products generated by the decomposition of the expanding agent.

Under these conditions, no pre-expansion occurs, or at least such pre-expansion occurs in a very limited amount, in any case not higher than 5% by volume relatively to the starting volume of the slab.

At the end of said time period, the pressure in the autoclave is released, until it reaches the atmospheric value, causing the molten and cross-linked polyethylene to expand. It was found that the times needed for lowering the pressure from the said values down to the atmospheric value are important, and that the best results are to be obtained with times of from 0.5 to 3 minutes.

Another important feature of the present invention is the fact that the volume of the autoclave be greater than the end volume of the expanded cross-linked polyethylene body and that the geometrical shape of the autoclave be such, as to avoid any contacts of the body which is being expanding with the inside surfaces of the autoclave, different to the supporting surface. This is therefore a "free" expansion, which, quite surprisingly, originates geometrically regular bodies.

By operating within the ranges of conditions previously defined, and with solids slabs having the aforementioned dimensions, bodies are typically obtained of expanded cross-linked polyethylene having the shape of plates with dimensions of 50–60 cm and thickness of 3–5 cm. It is obviously possible to obtain bodies of different dimensions, as a function of the largeness and of the composition of the slab, as well as of the expanding conditions.

In any case, the thus obtained expanded cross-linked polyethylene contains closed cells, the average dimensions of the cells being of the magnitude of from 0.2 to 0.4 mm. These cells are evenly distributed throughout the whole volume of the expanded body and this latter is free, or substantially free, from superficial faults, which allows the finishing treatments to be eliminated, or at least to be minimized. The specific gravity of the expanded item is typically of the order of from 40 to 45 kg/cu.m, and it is obviously possible to obtain greater or lower specific gravities, in function of the conditions under which the process is carried out. The stiffness of the expanded item can vary from 2.9 to 10 kg/sq.cm, mainly as a function of the nature of the polyethylene submitted to the cross-linking and expansion process.

The expanded items of polyethylene produced according to the process of the present invention can be used, among others, as heat insulating materials, as vapour barrier in the building field, and in the production of floating pipings. Due to the floating characteristics deriving from the closed cells and from the hydrophobic character of the polymer used, the expanded items are scarcely permeable by water and water vapour, and can therefore be used for manufacturing elements for insulating pipes, also in view of their thermoforming characteristics.

The experimental Examples which follow are illustrative and not limitative of the invention.

EXAMPLE 1

600 g of linear low density polyethylene (LLDPE), consisting of a copolymer of ethylene with butene-1, containing 3% of weight of butene-1, and having a specific gravity of 0.94 g/ml and melt index of 0.3 g/10', are molten at a temperature of about 135° C.

To the molten ethylene polymer are added, in the following order:
Stearic acid, 3 g
Zinc oxide, 12 g
Perkadox 14/40' (1,3-bis(Tert.-butylperoxy-isopropyl)-benzene at 40% by weight supported on $CaCO_3$; commercial product by the firm AKZO), 3g
Genitron AC 4 (azodicarbonamide, commercial product by the firm ICI), 48 g These ingredients are incorporated within the molten polymer batch and are homogenized in a time of about 8 minutes. The so obtained mixture is compression moulded in a 20×20 cm mould, with 1.5 cm thickness, at 135° C., for 5 minutes, under a pressure of about 50 bar. After the time said has elapsed, the polymer mass is cooled down to room temperature, with a cooling rate of 20° C. per minute. A solid and regular slab is thus obtained, having the dimensions of the mould.

This slab is then placed on a metallic support on the bottom of an air-tight autoclave, whose inner chamber has dimensions of 60×60 cm, and height of 20 cm. The slab is heated at 180° C., for a time of 30 minutes, under a nitrogen pressure of about 55 bar.

At the end of the said time period, the pressure is released, down to the atmospheric value, in a time of 1 minute, and a sheet of expanded material is extracted from the autoclave, with dimensions 55×55 cm, and thickness 4,1 cm.

The expanded sheet so obtained has closed cells, evenly distributed throughout its whole volume, the largeness of the cells being of 0.2–0.4 mm. The expanded matter has a specific gravity of about 40 kg/cu.m, and a stiffness of 7 kg/sq.cm.

The sheet has a regular shape, and is free from superficial faults.

EXAMPLE 2

The process is carried out as in Example 1, homogenizing: linear low density polyethylene (LLDPE; copolymer of ethylene with 3% by weight of butene-1, specific gravity 0.94 g/ml and melt index 0.92 g/10') (100 parts by weight), stearic acid (0.5 parts by weight), zinc oxide (2.0 parts by weight), Perkadox 14/40' (0.75 parts by weight), Genitron AC4 (8 parts by weight).

By operating as in Example 1, a sheet of expanded cross-linked polyethylene is obtained, with dimensions 55×55 cm, thickness 4.1 cm, specific gravity of about 43 kg/cu.m and stiffness 7 kg/sq.cm. The sheet is regular and without faults. The closed cells of the expanded sheet have dimensions of the order of 0.2–0.4 mm.

EXAMPLE 3

The process is carried out as in Example 2, using a linear low density polyethylene (LLDPE), copolymer of ethylene with 4% by weight of butene-1, having a specific gravity of 0.93 g/ml and a melt index of 0.42 g/10'.

An expanded cross-linked polyethylene sheet is obtained, with dimensions 55×55 cm, thickness 4.1 cm, specific gravity about 43 kg/cu.m and stiffness 3.6 kg/sq.cm.

The sheet is regular and free from superficial faults. The dimensions of the closed cells of the expanded sheet are of the order of 0.2–0.4 mm.

EXAMPLE 4

The process is carried out as in Example 1, homogenizing: low density polyethylene (outcoming from a high pressure polymerization process), having specific gravity 0.92 g/ml and melt index 0.3 g/10' (100 parts by weight), Perkadox 14/40' (1.5 parts by weight) and Genitron AC4 (8 parts by weight).

A sheet of expanded cross-linked polyethylene is obtained, with dimensions 55×55 cm, thickness 4.1 cm, specific gravity about 40 kg/cu.m and stiffness 2.9 kg/sq.cm. The sheet has a regular shape and is free from superficial faults. The closed cells of the expanded sheet have dimensions of the magnitude of 0.2–0.4 mm.

EXAMPLE 5

The process is carried out as in Example 1, using an ethylene-butene-1 copolymer, having specific gravity 0.955 g/ml and melt index 0.3 g/10'.

A sheet is obtained of expanded cross-linked polyethylene, with dimensions 55×55 cm, thickness 4.1 cm, specific gravity about 40 kg/cu.m and stiffness 10 kg/sq.cm. The sheet has a regular shape and is free from superficial faults. The closed cells of the expanded sheet have dimensions of the order of 0.2–0.4 mm.

EXAMPLE 6

The process is carried out in Example 1, homogenizing: linear low density polyethylene (LLDPE, copolymer of ethylene with 3% by weight of butene-1, of specific gravity of 0.94 g/ml and melt index of 0.3 g/10' (100 parts by weight), stearic acid (0.5 parts by weight), zinc oxide (20 parts by weight), Perkadox 14/40' (0.75 parts by weight) and Celogenra (p-toluenesulphonil-semicarbazide, commercial product by the firm UNIROYAL), (13.5 parts by weight).

A sheet is obtained of expanded cross-linked polyethylene, with dimensions 55×55 cm, thickness 4.1 cm, specific gravity about 45 kg/cu.m and stiffness 7 kg/sq.cm. The sheet has a regular shape and is free from superficial faults. The closed cells of the expanded sheet have dimensions of the magnitude 0.2–0.4 mm.

EXAMPLE 7

The process is carried out as in Example 6, using linear low density polyethlene (LLDPE, copolymer of ethylene with 4% by weight of butene-1), having a specific gravity of 0.93 g/ml and a melt index of 0.42 g/10'.

A sheet is obtained of expanded cross-linked polyethylene, with dimensions 55×55 cm, thickness 4.1 cm, spcific gravity about 43 kg/cu.m and stiffness 4.0 kg/sp.cm. The sheet is regulat and free from superficial faults. The closed cells of the expanded sheet have dimensions of the order of 0.2–0.4 mm.

EXAMPLE 8

The process is carried out as in Example 1, homogenizing at 145° C. an ethylene-butadiene copolymer, with 4% by weight of butadiene, with a density of 0.945 g/ml and melt index of 0.3 g/10'.

A sheet of expanded cross-linked polyethylene is obtained, with dimensions 55×55 cm, thickness 4 cm, specific gravity about 40 kg/cu.m and stiffness 8 kg/sq.cm.

The sheet is of regular shape, and free from superficial faults. The closed cells of the expanded sheet have dimensions of the magnitude of 0.2–0.4 mm.

EXAMPLE 9

The process is carried out as in preceding Example 8, homogenizing the ethylene-butadiene copolymer with stearic acid (1 part by weight), zinc oxide (5 parts by weight), sulphur (3 parts by weight), N-oxydiethylbenzothiazole-2-sulphenamide (commercial product NABS Special by the firm AMERICAN CYANAMID) (1.5% by weight), benzothiazyl disulphide (commercial product Vulkacit DM, by the firm BAYER) (0.5% by weight) per 100 parts by weight of copolymer. A sheet of expanded cross-linked polyethylene is obtained, with dimensions 55×55 cm, thickness 4 cm, specific gravity about 40 kg/cu.m and stiffness 4 kg/sq.cm.

The sheet is free from superficial faults. The closed cells of the expanded sheet have dimensions of 0.2–0.4 mm.

EXAMPLE 10

Results similar to those of the preceding Example are obtained by using equal quantities of tetramethylthiuram disulphide (commercial product Vulkacit Thiuram, by the firm BAYER) and 2-mercaptobenzothiazole (commercial product Vulkacit Mercapto, by the firm BAYER) instead of N-oxydiethylbenzothiazole-2-sulphenamide and benzothiazyl disulphide respectively.

EXAMPLE 11

The process is carried out as in Example 1, using an ethylene-propylene copolymer, containing 1% by weight of propylene, with density 0.96 g/ml and melt index 0.3 g/10'. The homogenization of the copolymer with the ingredients is carried out at 145° C.

An expanded cross-linked polyethylene is obtained, with dimensions 55×55 cm, thickness 4 cm, specific gravity about 40 kg/cu.m and stiffness 10 kg/sq.cm. The sheet is free from superficial faults. The closed cells of the expanded sheet have dimensions of 0.2–0.4 mm.

We claim:

1. Process for the preparation of bodies of expanded cross-linked polyethylene, with closed cells, comprising the steps of:

melting a polymer of ethylene selected among ethylene homopolymers, copolymers of ethylene with alpha-olefins, copolymers of ethylene with conjugated diolefins and relevant mixtures;

homogenizing said polymer of ethylene in the molten state with a quantity of from 0.1 to 2.5% by weight of a cross-linking agent and with a quantity of from 2 to 25% by weight of an expanding agent, said cross-linking agent and expanding agent having a decomposition temperature higher than the melting point of the polymer of ethylene, said homogenizing step operating at temperatures of from 130° to 150° C., and for times of from 5 to 10 minutes;

forming said homogeneous mixture in a solid parallelepiped shape by means of extrusion and subsequent cooling, or by means of moulding wherein the extrusion of moulding step is operated at temperatures within the range of from 130° to 150° C. and for times of from 1 to 10 minutes.

placing the solid parallelepiped shaped body inside an air-tight closed container, pressurizing the container by means of an inert gas, and heating the solid parallelepiped shaped body, at a temperature higher than the decomposition temperature of the cross-linking agent and the expanding agent contained therein, wherein this step is operated at 170°–200° C., under 40–70 bar for 20–45 minutes, in the absence, or substantial absence of expansion, such that expansion is limited to less than about 5%;

depressurizing the container immediately following the foregoing pressurizing and heating step for a time of from 0.5 to 3 minutes, allowing the body to expand to an end volume smaller than the volume of the container, and recovering the expaded cross-linked item from the container.

2. Process as claimed in claim 1, characterized in that said polymer of ethylene is a low density ethylene polymer with values of specific gravity of from 0.92 to 0.925 g/ml and values of melt index of from 0.2 to 2 g/10'.

3. Process as claimed in claim 1, characterized in that said ethylene polymer is an ethylene-butene-1 copolymer with a butene-1 content of from 0.5 to 4% by weight, specific gravity of from 0.93 to 0.96 g/ml and melt index of from 0.2 to 2 g/10'.

4. Process as claimed in claim 1, characterized in that said ethylene polymer is an ethylene-propylene copolymer, with a propylene content of from 1 to 2% by weight, specific gravity of from 0.95 to 0.96 g/ml and melt index of from 0.2 to 2 g/10'.

5. Process as claimed in claim 1, characterized in that said ethylene polymer is an ethylene-butadiene copolymer, with a content of butadiene of from 2 to 4% by weight, specific gravity of from 0.94 to 0.95 g/ml and melt index of from 0.2 to 2 g/10'.

6. Process as claimed in claim 1, characterized in that the cross-linking agent has a decomposition temperature which is higher than the melting point of the polyethylene by 10° to about 80° C.

7. Process as claimed in claim 1, characterized in that the cross-linking agent is selected among 1,3-bis-(tert.-butylperoxyisopropyl)benzene-dicumylperoxide, tert.-butylcumylperoxide, 2,5-dimethyl-2,5-di(tert.-butyl-peroxy)hexane and 2,5-dimethyl-2,5-di(tert.-butyl-peroxy)hexyne.

8. Process as claimed in claim 1, characterized in that the cross-linking agent is used in the quantity of from 0.2 to 1.5% by weight relative to the ethylene polymer.

9. Process as claimed in claim 1, characterized in that the ethylene polymer is an ethylene-butadiene copolymer and the cross-linking agent consists of sulphur and a rubber accelerator.

10. Process as claimed in claim 1, characterized in that the expanding agent has a decomposition temperature which is higher than the melting point of the polyethylene by 5° to about 70° C.

11. Process as claimed in claim 1, characterized in that the expanding agent is selected among: azodicarbonamide, p-toluenesulphonylsemicarbazide, p-carboxy-N-nitroso-N-methylbenzamide, N,N'-dinitrosopentamethylenetetramine, N-nitroso-N-alkylamides of aromatic carboxyl acids, trans-N,N'-dinitroso-N,N'-dimethylhexahydroterephtalamide, N,N'-dinitroso-N,N'-dimethylterephtalamide and diphenylsulphone-3,3'-disulphohydrazide.

12. Process as claimed in claim 1, characterized in that said expanding agent is used in the quantity of from 5 to 15% by weight relatively to the ethylene polymer.

13. Process as claimed in claim 1, characterized in that the ethylene polymer is homogenized with an additive selected among dyes, fillers, lubricants, pigments and flame retardants.

* * * * *

UNITED STATES PATENT AND TRADEMARK OFFICE
CERTIFICATE OF CORRECTION

PATENT NO. : 4,559,190
DATED : December 17, 1985
INVENTOR(S) : Saverio Quintavalle; Luciano Gargani It is certified that error appears in the above-identified patent and that said Letters Patent is hereby corrected as shown below:

Column 8, line 52, change "of" to -- or --;

Column 8, line 54; change "." to -- ; --; and

Column 9, line 2; change "expaded" to -- expanded --.

Signed and Sealed this

Fifteenth Day of April 1986

[SEAL]

Attest:

DONALD J. QUIGG

Attesting Officer    Commissioner of Patents and Trademarks